United States Patent
Spence et al.

(10) Patent No.: US 7,961,922 B2
(45) Date of Patent: Jun. 14, 2011

(54) SYSTEMS AND METHODS FOR PROCESSING MEDICAL IMAGE DATA TO FACILITATE COMPARISONS AMONG GROUPS OF SUBJECTS

(75) Inventors: Jeffrey S. Spence, Forney, TX (US); Patrick S. Carmack, Dallas, TX (US); Qihua Lin, Irving, TX (US); Richard F. Gunst, Dallas, TX (US); William R. Schucany, Dallas, TX (US); Robert W. Haley, Dallas, TX (US)

(73) Assignees: The Board of Regents of the University of Texas System, Austin, TX (US); Southern Methodist University, Dallas, TX (US)

( * ) Notice: Subject to any disclaimer, the term of this patent is extended or adjusted under 35 U.S.C. 154(b) by 1017 days.

(21) Appl. No.: 11/756,454

(22) Filed: May 31, 2007

(65) Prior Publication Data

US 2008/0298659 A1     Dec. 4, 2008

(51) Int. Cl.
    *G06K 9/00*     (2006.01)
    *G06F 19/00*    (2011.01)
    *G06F 17/18*    (2006.01)
    *G06E 1/00*     (2006.01)

(52) U.S. Cl. ............. 382/128; 702/19; 702/181; 706/10
(58) Field of Classification Search .................. 382/128, 382/129, 130, 131, 132, 133, 134; 600/407, 600/410, 425, 300; 128/916, 920, 922; 435/6, 435/4, 7.1; 702/19, 181; 706/10
See application file for complete search history.

(56) References Cited

U.S. PATENT DOCUMENTS

| | | | |
|---|---|---|---|
| 5,357,428 A * | 10/1994 | Stone, Jr. ...................... | 600/372 |
| 6,795,794 B2 * | 9/2004 | Anastasio et al. ............ | 702/181 |
| 2003/0036083 A1 | 2/2003 | Tamez-Pena et al. ............ | 435/6 |
| 2003/0088177 A1 | 5/2003 | Totterman et al. ............ | 600/414 |
| 2003/0167148 A1 | 9/2003 | Anastasio et al. ............ | 702/181 |
| 2005/0009003 A1 | 1/2005 | Deco et al. ......... | 435/4 |
| 2005/0058331 A1 | 3/2005 | Klotz ............................ | 382/131 |
| 2005/0283053 A1 * | 12/2005 | deCharms ..................... | 600/300 |
| 2006/0104494 A1 | 5/2006 | Collins et al. ................. | 382/128 |
| 2007/0081706 A1 | 4/2007 | Zhou ............................. | 382/128 |

FOREIGN PATENT DOCUMENTS

| WO | WO 03/009214 | 1/2003 |
|---|---|---|
| WO | WO 03/021524 | 3/2003 |
| WO | WO 2006/099179 | 9/2006 |

OTHER PUBLICATIONS

Carmack et al., "Improved agreement between Talairach and MNI coordinate spaces in deep brain regions," *NeuroImage*, 22:367-371, 2004.

(Continued)

*Primary Examiner* — Abolfazl Tabatabai
(74) *Attorney, Agent, or Firm* — Fulbright & Jaworski LLP

(57) ABSTRACT

Systems and methods for processing medical image data with increased sensitivity to facilitate comparisons among groups of subjects are disclosed herein. In one embodiment, a method comprises receiving a first three-dimensional image comprising a plurality of voxels, reducing a regional trend within the three-dimensional image, computing a semivariogram for a region of interest, defining at least one block of spatially correlated voxels, calculating voxel weights for each voxel within the at least one block, and determining a block average count and variance for the at least one block.

19 Claims, 7 Drawing Sheets

OTHER PUBLICATIONS

Christensen and Yetkin, "Spatio-temporal analysis of auditory cortex activation as detected with silent event related fMRI," *Stat. Med.*, 24:2539-2556, 2005.

Haley et al., "Evaluation of neurologic function in Gulf War veterans. A blinded case-control study," *JAMA*, 277:223-230, 1997.

Ruis-Alzola et al., "Nonrigid registration of 3D tensor medical data," *Med. Image Anal.*, 6:143-161, 2002.

Spence et al., "Using a white matter reference to remove the dependency of global signal on experimental conditions in SPECT analyses," *NeuroImage*, 32:49-53, 2006.

* cited by examiner

Group Comparisons of Average Treatment - Baseline Differences.

| Group Comparison | Left Amygdala | Right Amygdala | Left Caudate | Right Hippo-campus | Right Pons | Right Putamen | Left Thalamus |
|---|---|---|---|---|---|---|---|
| (a) Specified Regions of Interest, Spatial Modeling Averages ||||||||
| 4-Group F Tests | 0.015 | | 0.001 | | | | 0.002 |
| Control < Syn 2 | | | 0.009 | | | | |
| Syn 1 < Syn 2 | | | | | | | 0.003 |
| Syn 3 < Syn 2 | 0.013 | | 0.003 | | | | |
| Syn 1 < Control | | | | | | | 0.042 |
| (b) Individual Blocks in Specified ROIs, Spatial Modeling Averages (block numbers in parentheses) ||||||||
| 4-Group F Tests | 0.016(1) | 0.028(2) | 0.010(1) | 0.014(2) | 0.032(1) | 0.007(3) | 0.002(3) |
|  | 0.030(2) | | 0.002(2) | | | | 0.001(5) |
| Control < Syn 2 | 0.028(2) | | 0.031(1) | | | | |
|  | | | 0.012(2) | | | | |
| Syn 1 < Syn 2 | | | | 0.029(2) | | 0.026(3) | 0.003(3) |
|  | | | | | | | 0.001(5) |
| Syn 3 < Syn 2 | 0.010(1) | | 0.025(1) | | | | |
|  | | | 0.006(2) | | | | |
| Syn 1 < Control | | | | | | 0.028(3) | 0.010(3) |
| Syn 2 < Syn 3 | | | | | 0.025(1) | | |
| (c) Clusters Obtained from Separate Voxel-by-voxel SPM Analysis of Each ROI. (small-volume-corrected; block number in parentheses) ||||||||
| 4-Group F Tests ||||||||
| Control < Syn 2 | | | 0.036(2) | | | | |

FIG. 8

SYSTEMS AND METHODS FOR PROCESSING MEDICAL IMAGE DATA TO FACILITATE COMPARISONS AMONG GROUPS OF SUBJECTS

FEDERALLY-SPONSORED RESEARCH AND DEVELOPMENT

Aspects of this invention were made with government support by the U.S. Army Medical Research and Material Command numbers DAMD17-97-2-7025 and DAMD17-01-1-0741, and U.S. Public Health Service grant M01-RR00633. The government may accordingly have certain rights in this invention.

BACKGROUND OF THE INVENTION

1. Field of the Invention

The present invention relates generally to image processing, and, more particularly, to systems and methods for processing medical image data to facilitate comparisons among groups of subjects.

2. Description of Related Art

United Nations military personnel returning from the 1991 Persian Gulf War reported post-war changes in mental function and physical performance that did not seem reasonably attributable to known maladies such as infectious diseases or post-traumatic stress disorder. A study by Haley et al. analyzed medical records, wartime exposures, responses from a survey instrument of illness symptoms, and psychological profiles of 249 U.S. Naval reservists of the 24th Reserve Naval Mobile Construction Battalion ("seabees") who were stationed in the Gulf War theater of operations.

They characterized three primary medical syndromes that were shared by approximately one-third of the 175 seabees who complained of serious health problems believed to have resulted from service in the Gulf War. Kang et al. confirmed the syndromes in a stratified sample of all the military personnel who were deployed in the war. In a clinical study of 26 affected Gulf War veterans and 20 matched controls, Haley et al. (1997b) concluded that the observed abnormalities in brain functioning were consistent with subcortical and brainstem dysfunction. In an epidemiological study of self-reported risk factors of the 249 seabees, Haley et al. found that the three primary syndromes were consistent with chemical exposures but not with other proposed risk factors such as oil well fires or combat stress. Postulating that the syndromes were due to deep-brain irregularities or malfunctions, a subsequent study of 39 syndrome and control seabees using single-photon emission computed tomography (SPECT) brain imaging was undertaken.

Impaired cognition ("Syndrome I") was characterized by distractibility, difficulty remembering, depression, insomnia, confused thought processes, and migraine headaches. Confusion ataxia ("Syndrome II") was characterized by difficulty with thinking and reasoning, confusion with where one is or what one is doing, disorientation, balance problems, sensations of rooms spinning, stumbling, physician diagnosis of post-traumatic stress disorder, liver disease, or sexual impotence. Central pain ("Syndrome III") was characterized by joint and muscle pain, muscle fatigue, tingling, and numbness. Haley et al. attributed these syndromes to neurological damage, possibly from exposure to chemical nerve agents, anti-nerve gas medication, pesticides, or high concentrations of insect repellants in genetically predisposed individuals. They postulated that exposure to these agents might have caused damage in the basal ganglia or the brainstem, which are gray-matter structures deep within the brain.

In an attempt to identify areas of the deep brain that might have been affected by exposures in the Gulf War, an experiment was conducted with the voluntary participation of five "Syndrome I subjects," twelve "Syndrome II subjects," five "Syndrome III subjects," and seventeen "control subjects" from the original study of 249 seabees. The small numbers of subjects in each group reflect the costs (medical personnel, housing, medications, and tomography) incurred in performing multiple brain scans on each of these subjects by Haley et al. (The larger relative number of subjects in the Syndrome II group is due to previous neurological studies that indicated this group was the most severely affected.)

In that study, control subjects were closely matched by age, gender, and education to the Syndrome II subjects. Nine of the controls served in the Gulf War theater of operations but did not subsequently report any adverse health effects. Eight of the controls remained in the United States. Since no substantive differences were detected between the two groups of control subjects, they were combined for the analysis reported below.

Between December of 1997 and June of 1998, SPECT scans of brain activity were obtained on each subject during a baseline session and 2-5 days later in a treatment session. The goal of the SPECT imaging was to determine the extent of brain activity through measurements of the rate of cerebral blood flow. A radioactive tracer was introduced into each subject's blood through a rapid intravenous injection. Differential blood flow in the brain causes more radiation to be emitted in active brain areas where the rate of blood flow is relatively high and less to be emitted in areas where blood flow is reduced by inactivity, normal inhibition, or impairment. In the baseline session, the patients were administered the radioactive tracer after an intravenous infusion of a placebo, saline. In the treatment session, physostigmine was added to the saline infusion. Physostigmine elevates acetylcholine, which typically inhibits brain activity in normally functioning gray-matter regions of the brain. It was anticipated that healthy brain regions for both syndrome and control groups would exhibit inhibited gray-matter brain activity in the treatment session. While it was suspected that dysfunctional gray-matter brain regions in the syndrome subjects that were damaged by Gulf War exposures would show little or no change between the baseline and treatment sessions, there was no conclusive information from previous clinical investigations about the nature of the effects of physostigmine on dysfunctional brain regions.

As a result, SPECT intensity counts were then made available for approximately 200,000 2×2×2 $mm^3$ volume elements, or voxels, of each of the 39 subject brains at each measurement session. Nonetheless, conventional methods of brain image analysis at individual brain locations have been unable to detect any significant differences in brain activity among these various groups. The size and complexity of brain imaging databases confront statistical analysts with a variety of issues when assessing brain activation differences between groups of subjects. Detecting small group differences in activation is compounded by the need to analyze hundreds of thousands of spatially correlated measurements per image. These analyses are especially problematic when, as is typical, the number of subjects in each group is small.

In light of the foregoing, the inventors hereof have recognized a need for new systems and methods for processing medical image data with increased sensitivity to facilitate comparisons among groups of subjects.

BRIEF SUMMARY OF THE INVENTION

The present invention provides systems and methods for processing medical image data to facilitate comparisons among groups of subjects. In one embodiment, a method comprises receiving a first three-dimensional image comprising a plurality of voxels, reducing a regional trend within the three-dimensional image, computing a semivariogram for a region of interest, defining at least one block of spatially correlated voxels, calculating voxel weights for each voxel within the at least one block, and determining a block average count and variance for the at least one block.

In another embodiment, a method for processing brain image data with increased sensitivity to facilitate comparisons among groups of subjects comprises selecting a plurality of groups of subjects, receiving at least one three-dimensional brain image from each of the subjects, each of three-dimensional brain images comprising a plurality of voxels, and modeling the at least one region of interest of the plurality of three-dimensional brain images, in part, by selecting blocks of voxels so that centers of adjacent blocks are separated by a distance no closer than a range at which voxel counts are uncorrelated.

In yet another embodiment, a computer readable medium having a computer program recorded thereon causes a computer to perform the steps of receiving a plurality of three-dimensional images, each image comprising a plurality of voxels and each voxel indicating an intensity measurement, reducing a regional trend by spatially fitting a regional mean across a region, computing semivariograms using detrended voxel measurements for each region of interest (ROI) to determine an extent of intervoxel correlation structure, defining blocks of spatially correlated voxels so that centers of adjacent blocks are no closer than a range parameter computed from the semivariograms, calculating voxels weights within each defined block by solving a kriging system of equations, and determining block average counts and variances for each block by taking the weighted average of voxels within a block.

The term "coupled" is defined as connected, although not necessarily directly, and not necessarily mechanically.

The terms "a" and "an" are defined as one or more unless this disclosure explicitly requires otherwise.

The terms "substantially," "approximately," "about," and variations thereof are defined as being largely but not necessarily wholly what is specified, as understood by a person of ordinary skill in the art. In one non-limiting embodiment, the term substantially refers to ranges within 10%, preferably within 5%, more preferably within 1%, and most preferably within 0.5% of what is specified.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

BRIEF DESCRIPTION OF THE SEVERAL VIEWS OF THE DRAWINGS

For a more complete understanding of the present invention, reference is now made to the following drawings, in which:

FIG. 8 shows a table of results providing group comparisons according to an embodiment of the present invention.

DETAILED DESCRIPTION OF THE INVENTION

Figure 1:
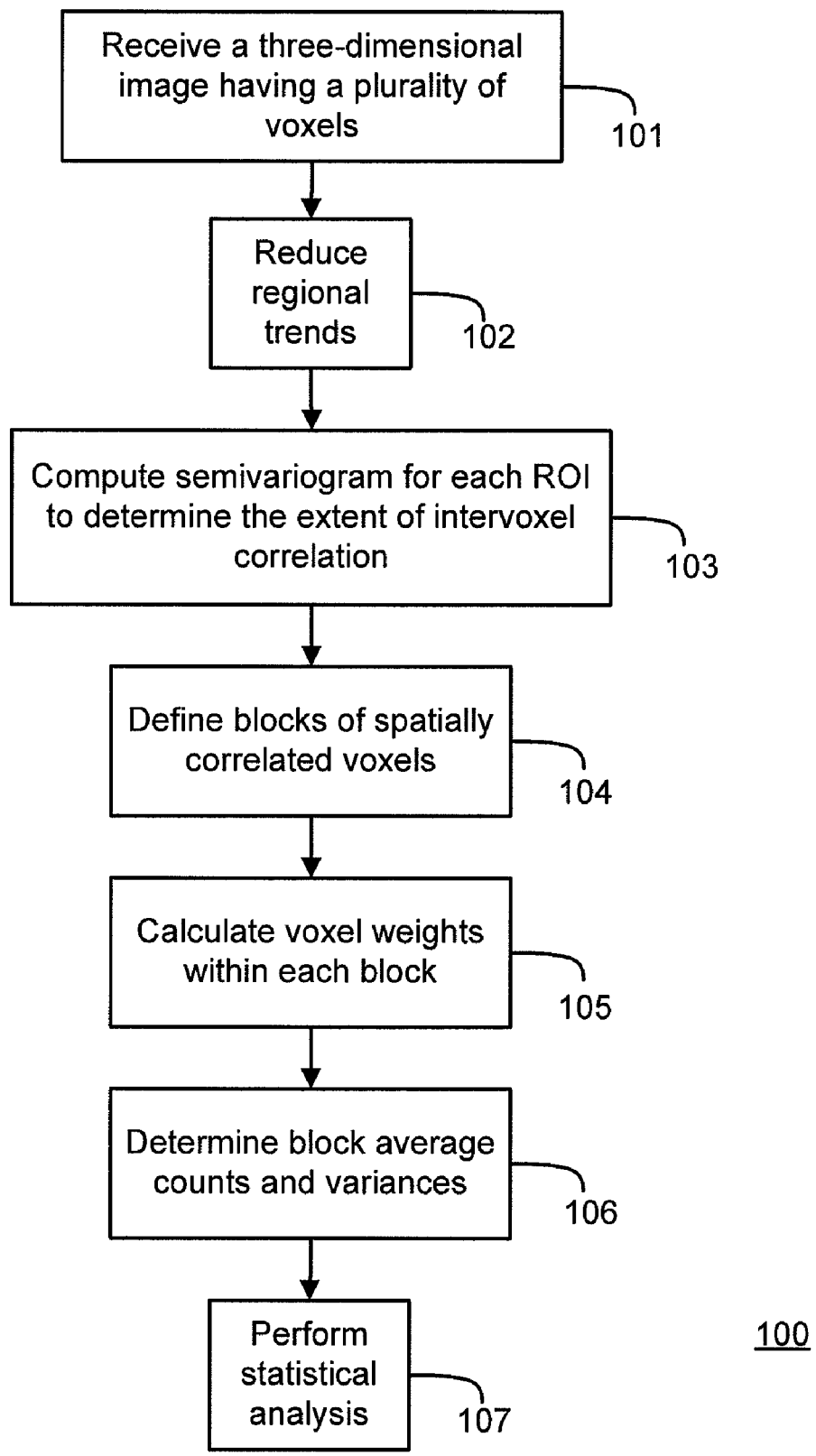
FIG. 1 shows a flowchart of a spatial statistical modeling method according to an embodiment of the present invention.

In the following detailed description, reference is made to the accompanying drawings that illustrate embodiments of the present invention. These embodiments are described in sufficient detail to enable a person of ordinary skill in the art to practice the invention without undue experimentation. It should be understood, however, that the embodiments and examples described herein are given by way of illustration only, and not by way of limitation. Various substitutions, modifications, additions, and rearrangements may be made without departing from the spirit of the present invention. Therefore, the description that follows is not to be taken in a limited sense, and the scope of the present invention is defined only by the appended claims.

The present invention provides systems and methods for processing medical image data with increased sensitivity to facilitate comparisons among groups of subjects. Some of the embodiments described herein have been developed, in part, from the present inventors' realization that spatial modeling would increase the sensitivity of group comparisons. In one such embodiment, a spatial modeling of intervoxel correlations may be used for increasing the sensitivity of group comparisons.

The inventors have discovered that correlations among normalized voxel counts are large in neighboring voxels and decrease in magnitude until they become negligible after a critical distance. Exploring this discovery, blocks of contiguous voxels may be defined within each of several structures within the deep brain, so that the geometric centers of the blocks are no closer than the range at which voxel counts may be considered uncorrelated. Using kriging methods or the like, block averages and their prediction variances may be calculated. For each structure of interest, the block averages within the structure may be weighted by their prediction variances, thus producing a structure average for each subject. Subject averages and their prediction variances may be used in a linear model to compare group effects. This analysis has proven to be much more sensitive to group mean differences and far superior to the unsatisfactory voxel-by-voxel analysis presently used by medical researchers.

In one illustrative, non-limiting experiment described below, systems and methods according to the present invention have been applied to comparisons of single-photon emission computed tomography (SPECT) brain-imaging data from four groups of subjects, three of which have variants of the 1991 Gulf War syndrome and one of which is a control group. Spatial modeling and analyses of these data have identified regions of the deep brain that exhibit statistically significant group differences. In contrast, commonly used voxel-by-voxel group comparisons do not identify any brain structures that are significantly different for the syndrome and control groups in the analysis of cholinergic response to a physostigmine drug challenge. The results provided herein are consistent with medical evidence that these structures might have been affected by Gulf War chemical exposures.

Image Pre-Processing

Brain measurements are highly variable among individuals, between sessions for each individual, and among voxels within a structure at one session for one individual. Mapping brain locations across subjects and sessions may be complicated by problems with alignment of subjects in the radiation-detecting scanner, head movements as measurements are being taken, and differences in brain sizes and shapes, among others. Several preprocessing steps are outlined herein to facilitate such mapping, although other pre-processing methods and steps may be used to achieve similar results.

In a first pre-processing step, mapping is performed for group comparisons. In one embodiment, baseline and treatment SPECT scans may be mapped to a magnetic resonance image (MRI) scan of an individual's brain. Additionally or alternatively, a Statistical Parametric Mapping (SPM) spatial normalization may be used to map brain images to a standard three-dimensional space of the SPM SPECT template coordinates of an average brain. Optionally, smoothing methods (e.g., kernel smoothing) may be used to reflect brain activity in clusters of voxels and to accommodate the likelihood that voxel locations may not be exactly the same in each registered scan. However, smoothing should preferably not be used when spatial averages show a tendency to mask differences in intensities within specified deep-brain gray-matter structures of interest. For example, masking may occur when meaningful differences in signal intensity within small structures are averaged with smaller inhomogeneous differences in intensity from neighboring gray-matter structures, white-matter structures, or ventricles filled with cerebrospinal fluid.

In a second pre-processing step, intensity counts for each individual and each session may be scaled to a comparable magnitude in a procedure called count normalization. This step is often necessary due to the rapid decay of radioactive tracers. Even with the greatest of experimental care, intra- and inter-individual differences in tracer decay rates occur because of uncontrollable session-to-session variation in the exact amount and timing of tracer injections, equipment setup and calibration, and subject differences in metabolism and brain activity. In one embodiment, this step involves normalizing voxel counts by the median count from an easily identified region (e.g., the centrum semiovale). Accordingly, all voxel intensities may be normalized by dividing the individual voxel counts in a scan by the centrum semiovale median white-matter count and then scaling so that the median normalized intensity count in each scan's centrum semiovale equals 100.

In a third pre-processing step, individual structures or regions of interest (ROIs) within the deep brain may be identified from a standard coordinate system through the use of an atlas or the like (e.g., the Talairach atlas). The atlas may be used to identify intracranial structures by specifying coordinates of the voxel locations. An affine transformation may then be used to accurately map the atlas' coordinates of structures to standard coordinates while minimizing partial volume effects due to the selection of voxels for an ROI that contains portions of neighboring structures. In the experiment described herein, a total of 16 ROI databases may be created from the right and left halves of 8 deep brain structures: amygdala, caudate head, putamen, globus pallidus, thalamus, hippocampus, midbrain, and pons.

Spatial Statistical Modeling

The standard analysis of brain images uses statistics calculated voxel-by-voxel across individuals in each group and typically requires multiple-comparison adjustments to account for the calculation of up to hundreds of thousands of test statistics, one for each voxel location. Furthermore, individual test statistics do not include any information from neighboring voxels that might be experiencing similar neuronal activity. According to one embodiment of the present invention, spatial statistical modeling (commonly referred to as "kriging" in the geostatistical arts) may overcome both of these deficiencies, particularly when interest is focused on specific brain structures.

Turning now to FIG. 1, a flowchart of spatial statistical modeling method 100 according to an embodiment of the present invention is shown and described. In one embodiment, method 100 may be performed after one or more of the pre-processing steps outlined herein. In step 101, one or more three-dimensional images having a plurality of voxels are provided, where each voxel represents an intensity measurement. In step 102, regional trends are reduced or removed, for example, by fitting a regional mean spatially across a given region. In step 103 semivariograms may be computed using detrended voxel measurements for each region of interest (ROI) to determine the extent of intervoxel correlation structure (e.g., to define a range parameter) and to allow for optimal cluster averaging (e.g., block "kriging").

In step 104, blocks or clusters of spatially correlated voxels are defined so that centers of adjacent blocks are no closer than the range parameter from the semivariogram. In one embodiment, blocks may correspond to known nuclear structure of brain regions or be guided by medical knowledge. In another embodiment, blocks may be arbitrarily designed from the range parameter and the anatomic shapes of brain regions of interest. In step 105, voxels weights within each defined block may be calculated, for example, by solving a "kriging" system of equations. Block average counts and variances are calculated for each block in step 106, for example, by taking the weighted average of voxels within a block. In step 107, statistical analysis may be performed, for example, using a commercially available software program. Steps 101-107 are described in more detail in the paragraphs that follow.

Figure 2:
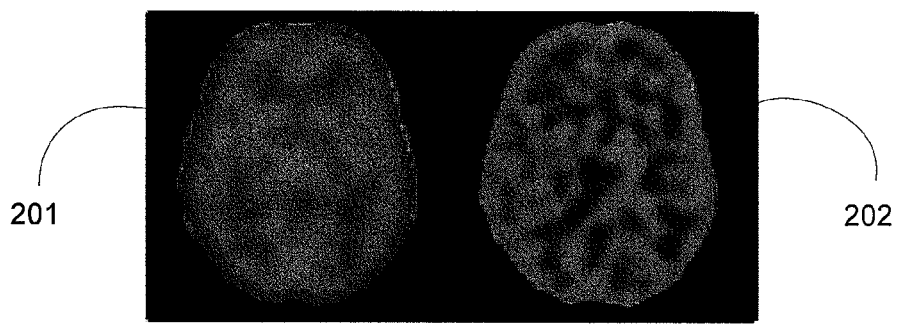
FIG. 2 shows pictures of a transaxial slice of a brain image having baseline intensity counts and baseline differences in counts, respectively, according to an embodiment of the present invention.
Figure 3:
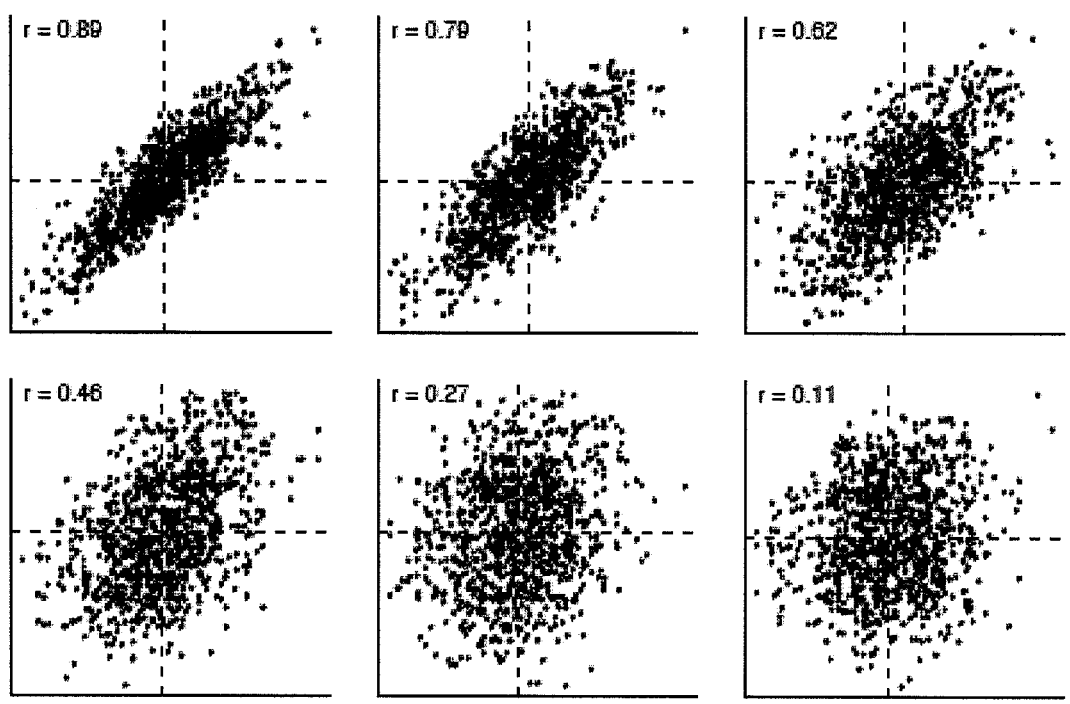
FIG. 3 shows several graphs of baseline quadratic-fit residuals for pairs of voxels in the left thalamus of a control subject, according to an embodiment of the present invention.

To better illustrate the relevance of voxel correlation and the role of step 102 in spatial statistical modeling method 100, reference is made to FIGS. 2 and 3. FIG. 2 shows pictures 201 and 202 of a transaxial slice of a brain image having baseline intensity counts and baseline differences in counts, respectively. Baseline differences in count are preferably used when there is an interest in determining changes in brain activity due to the effects of treatment with physostigmine. Differencing also removes substantial within-subject variability. In one embodiment, the use of quadratic fit residuals may eliminate some of the gross surface gradients that accounts for large positive spatial correlations. As such, step 102 allows a generalized covariance function, an important component of the spatial correlation function, to be more readily identified. However, a person of ordinary skill in the art will readily recognize that a quadratic surface fit is only one of many possible parametric and nonparametric choices for gradient removal.

FIG. 3 shows several graphs of baseline quadratic fit residuals for pairs of voxels in the left thalamus of a control subject. Pairs of residuals separated by a distance d are graphed in each of the six graphs shown, with one of the residuals in a pair arbitrarily assigned to the ordinate and the other to the abscissa. These graphs show that, even after differencing and trend removal, residuals from voxels in close proximity to one another are strongly correlated. In the experiment described herein, the magnitude of the correlation r was found to decrease as the distance between the pairs of voxel locations increased from 2 mm to 7 mm. Further, the greatest distances in these structures at which correlations tended to become negligible were approximately 5-7 voxels, or 10-14 mm.

Referring again to FIG. 1, a semivariogram is computed for each ROI to determine the extent of intervoxel correlation in step 103. In one embodiment, sample semivariogram values may be calculated in half-voxel bins from residuals of quadratic fits to the treatment-baseline differences in normalized count intensities, separately for each of 16 ROIs. Sample semivariogram values for the subjects in each group may then be averaged to facilitate comparisons among groups of subjects. To ensure that estimated semivariogram matrices are conditionally negative definite, several different theoretical semivariogram models may be fit to the sample semivariograms including, for example the Gaussian semivariogram model defined by:

$$\lambda(d) = \begin{cases} 0, & d = 0 \\ \theta_1 + \theta_2\{1 - \exp(-d^2/\theta_3^2)\}, & d > 0 \end{cases} \quad \text{Eq. (1)}$$

Figure 4:
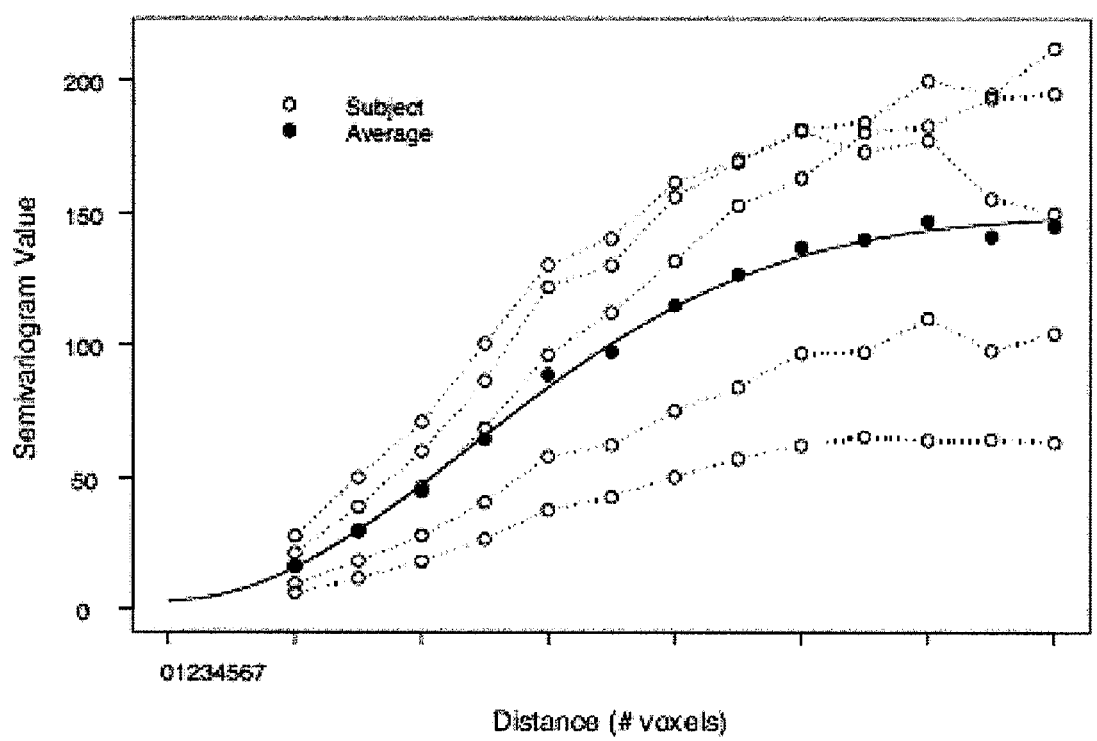
FIG. 4 shows a graph of baseline semivariogram values from the left caudate of several "syndrome III" subjects, according to an embodiment of the present invention.

FIG. 4 is a graph of baseline semivariogram values from the left caudate of several syndrome III subjects, according to an embodiment of the present invention. The "jumpy" behavior of individual subject semivariograms (white dots) is evident, as is the much smoother behavior of the average semivariogram (black dots). Also shown are the sample semivariogram averages and the Gaussian model fit (curve). The nugget parameter $\theta_1$ in Eq. (1) typically quantifies variability associated with microscale variation and measurement error. Microscale variation refers to uncontrolled variation that affects pairs of measurements at distances smaller than the smallest distance in a database (i.e., 1 voxel or 2 mm in the Gulf War SPECT study discussed herein).

In geostatistical applications, nuggets tend to be large, thus implying a lack of smoothness in measurements. Consequently, the Gaussian semivariogram model is infrequently used the geostatistical arts because its use implies smoothly varying measurements. Unexpectedly, however, with respect to the brain image data discussed herein, the Gaussian model may provide good fit to sample semivariogram values and estimated nuggets may be surprisingly small. Semivariogram values may be nonnegative, but not significantly different from 0 using z scores calculated from the estimated nugget and its estimated standard error. Because of the differentiability of the Gaussian semivariogram function, this implies that there is strong continuity in nearby voxel intensities for the subjects.

The size of the nugget variation can be better appreciated by comparing the nugget to the sill, $\theta_1 + \theta_2$ in Eq. (1). The sill represents the variability of uncorrelated treatment-baseline differences and is indicated in the figure by the plateau at large voxel distances. The sill is an asymptotic limit for the Gaussian semivriogram models but approximately 95% of its value is attained at a distance of $\sqrt{3}\theta_3$, where $\theta_3$ is referred to as the range parameter. For example, an estimated nugget, 3.3, is only 2.2% of the estimated sill 149.2.

The third parameter in Eq. (1) is the range parameter $\theta_3$. For the Gaussian model, pairs of measurements are essentially uncorrelated at distances greater than the practical range $\sqrt{3}\theta_3$. Depending upon the semivariogram model fit, this range may also be the approximate distance at which the fitted semivariogram values attain or are within 5% of the sill. For example, the ROI shown in FIG. 4, the practical range was calculated to be $\sqrt{3} \times 3.29 = 5.78$, or approximately 6 voxels. In this particular case, therefore, count normalized intensities may be treated as statistically uncorrelated if the distances between their locations exceed 6 voxels or 12 mm. As such, group differences based on average count intensities in blocks of contiguous voxels within each ROI may be analyzed as further explained below.

In step 104, blocks of spatially correlated voxels are defined at least in part based upon the computations described above. For example, the conclusion that neighboring voxels are experiencing similar activity whereas voxels approximately 12 mm apart are uncorrelated suggests group comparisons based on averages of intensity counts from blocks of neighboring voxels. Further, averages of contiguous voxels within blocks may produce better estimates of the mean activity in the block than do individual voxels. In addition, with the calculation of appropriate prediction variances, blocks within a ROI may be appropriately weighted to produce an average activity for the ROI, separately for each subject.

In the experiment discussed herein, for subcortical graymatter structures under investigation, blocks were defined with the following constraints: blocks in a ROI contain mutually exclusive voxel locations, blocks were identically defined for all 39 subjects, and the geometric centers of the blocks were at least as far apart as the maximum practical range for the group semivariogram models fit to the ROIs, 6 voxels. For each ROI, blocks were created by examining the three-dimensional geometry of the structure and selecting contiguous voxel locations that were as convex as each structure permitted. Approximate convexity was achieved by visually examining the voxel centers in each block to ensure, to the greatest extent possible, that pairs of voxel centers were connected with straight lines that lie wholly within the block. This choice of block geometry facilitated the use of Euclidian distance within both the blocks and the ROIs, which were approximately convex. The number of blocks created per structure ranged from 2 in each side of the amygdala and hippocampus, small deep-brain structures, to 6 in each side of the pons, putamen, and thalamus, which are larger deep-brain structures.

Figure 5:
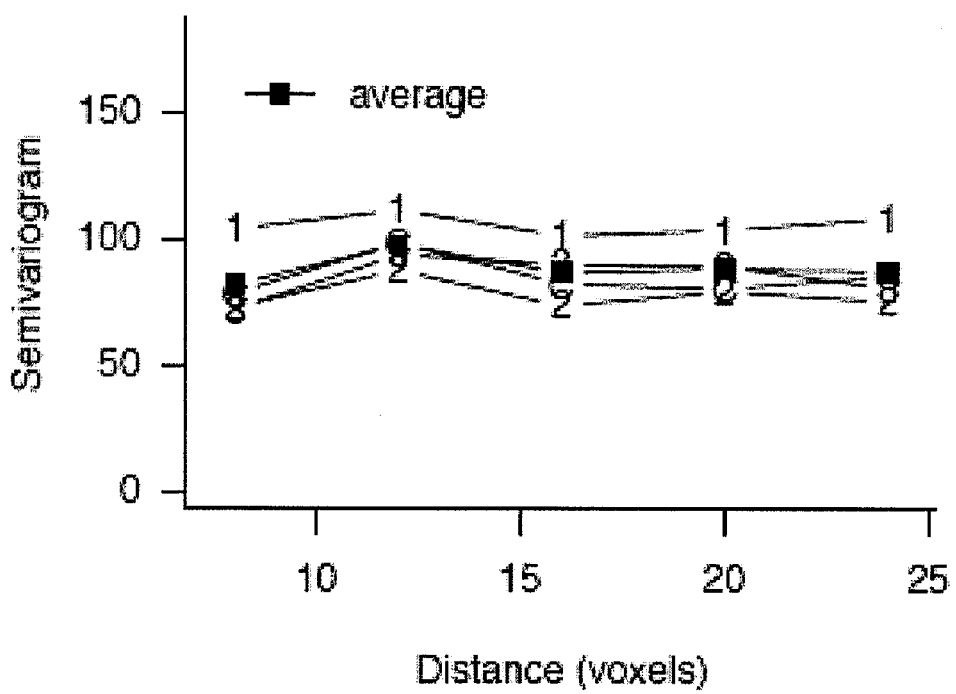
FIG. 5 shows a graph of baseline semivariogram values for each of the syndrome and control groups from the left middle frontal gyrus, according to an embodiment of the present invention.

FIG. 5 shows a graph of baseline semivariogram values for each of the syndrome and control groups from the left middle frontal gyrus, according to an embodiment of the present invention. Between 70 and 100 pairs of blocks are used in calculating the semivariogram values shown. The average semivariogram values for the 4 groups do not show any consistent pattern and the averages are relatively flat, as would be expected for semivariogram values from uncorrelated data. This is the same pattern found in the deep-brain structures that have many fewer blocks from which to calculate the semivariogram values. The calculation of block averages may be based on the following model for normalized treatment baseline SPECT intensity differences within each ROI:

$$Z(s) = \mu(s) + q(s) + e(s),\qquad \text{Eq. (2)}$$

where $Z(s)$ is the treatment baseline intensity difference at voxel location $s' = (x, y, z)$; x, y, and z are integer locations using the anterior commissure as the origin; $\mu(s)$ is a nonstochastic quadratic function of location; $q(s)$ is an $L_2$-continuous, zero-mean, spatially correlated error process representing inherent SPECT voxel-to-voxel variation; and $e(s)$ is a zero-mean spatial process representing microscale variability and measurement errors.

Referring back to FIG. 1, voxels weights within each defined block may be calculated in step 105. For example, let $z(B)$ denote a vector of normalized count intensity differences for an arbitrary set of n voxel locations $\{s_1, s_2, \ldots, s_n\}$ in a block B. Then a block average may be calculated as $avg(B) = w'z$, where w is a vector of weights determined as follows. Define B to be the n locations within the block that are shifted half a voxel unit in each direction from the n measured voxel locations $(x_i, y_i, z_i)$ in the block. For the ROIs that are right-half structures, the shifted locations are $(x_i+0.5, y_i+0.5, z_i+0.5)$. The left half-shifted locations are at $(x_i-0.5, y_i+0.5, z_i+0.5)$. The locations in B are shifted by half a voxel because the predictor using model (2) and a fitted Gaussian semivariogram model that has a zero nugget is an exact interpolator; i.e., it reproduces the actual $z(s_i)$ at the n measured voxel locations in the block. Shifting the prediction locations by half a voxel allows predictions and their prediction variances to be calculated for a grid of locations within the block, predictions that may be used to form the block and structure averages. These averages over gridded locations approximate the corresponding integral-based averages for the blocks and ROIs.

In step 106, block average counts and variances are calculated for each block. For example, denote by $\hat{\gamma}(B)$ the n-dimensional vector whose $i^{th}$ element is the average (across subjects in a group) semivariogram value between the measured location $s_i$ in the block and the n shifted locations in B. This vector of average semivariogram values is calculated using the fitted Gaussian semivariogram model for the ROI containing the block. Denote by $\hat{\Gamma}$ the n×n matrix of semivariogram values between pairs of measured locations in the block, again calculated from the fitted semivariogram model for the ROI. Then the universal block-kriging weights for calculating the block averages are:

$$\omega = \hat{\Gamma}^{-1}[\hat{\gamma}(B) + X\{X'\hat{\Gamma}^{-1}X\}^{-1}\{x - X'\hat{\Gamma}^{-1}\hat{\gamma}(B)\}],\qquad \text{Eq. (3)}$$

where x is a 10×1 vector including the average quadratic components of the locations in B and X is an n×10 matrix of the quadratic components of the measured locations in the block.

The estimated prediction variance for avg (B) is:

$$\hat{\sigma}_p^2 = 2\omega'\hat{\gamma}(B) - \omega'\hat{\Gamma}\omega - \hat{\gamma}(B,B),\qquad \text{Eq. (4)}$$

where $\hat{\gamma}(B,B)$ is the average of the $n^2$ semivariogram values $\hat{\gamma}(s_i,s_j)$ for n locations in B.

Spatial block averages may be similar when neighborhood sizes are varied, including when the entire structure was used as one neighborhood for each of the blocks in the ROI. This method advantageously assures zero or negligible correlations among predicted block averages within an ROI, provides essentially the same predicted block average as predictions from differing neighborhood sizes, produces approximately the same prediction variance in numerically stable kriging equations using Eq. (3), and improves the stability of the kriging system matrix when the system of equations in Eq. (3) is unstable (e.g., when the nugget parameter estimate is close to zero or negative and the range parameter estimate is large relative to the ROI volume).

Experiment: Analysis of Gulf War SPECT Data

In this exemplary, non-limiting experiment, the inverses of the block prediction variances calculated from Eq. (4) were used as weights to form a ROI weighted average (avg $(ROI)_{ij}$) for subject j in group i. Prediction variances ($\sigma_{ij}^2$) for the ROI subject averages were also calculated. The ROI subject averages and their prediction variances were then input into a linear model avg $(ROI)_{ij} = \mu + \theta_i + e_{ij}$, where $\theta_i$ represents the group mean and $e_{ij}$ is the heteroscedastic within-subject variability for the ROI average, with variance estimated by $\sigma_{ij}^2$. A similar model, without the averaging across blocks, is used in the block analysis reported below.

Referring now to FIG. 8, the table provides ROI group comparisons. Included in the table are the ROIs where significant (p<0.05) average treatment baseline differences among the groups were found. In part (a) of the table, the ROI group comparisons, the left amygdala, the left caudate, and the left thalamus produced statistically significant 4-group F tests for the entire ROI. The entries in part (a) of the table below the 4-group F tests are pairwise comparisons of group averages using Tukey's studentized range statistic. These comparisons are two-sided with an inequality A<B in the first column of the table indicating that the significant result was due to group A having a significantly smaller average treatment baseline difference than group B.

As noted above, normal brain response to physostigmine was expected to produce relatively large, negative treatment-baseline differences. The significant Control<Syn 2 result for the left caudate has an average treatment-baseline difference for the control group that is negative, as expected. The other two significant results have Syndrome I and Syndrome III average differences that are also negative. All the Syndrome II average differences are positive. The Syn 1<Control comparison has a very large negative average (−12.0) for the Syndrome I group and a weak positive average (1.0) for the control group. The positive average is not significantly different from 0 (p>0.05) and the comparison with the average for the Syndrome I group is only borderline significant at the 0.05 level (p=0.042). The positive average treatment-baseline differences for the Syndrome II group caused a further investigation of the treatment and baseline intensities.

Figure 6A:
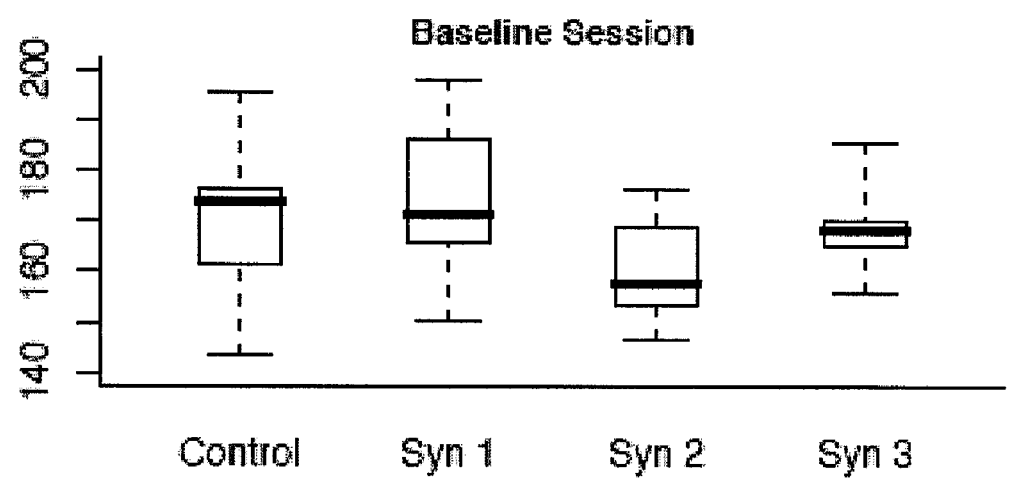
FIGS. 6A-B show boxplots of baseline and treatment normalized intensities in the left caudate, respectively, according to an embodiment of the present invention.
Figure 6B:
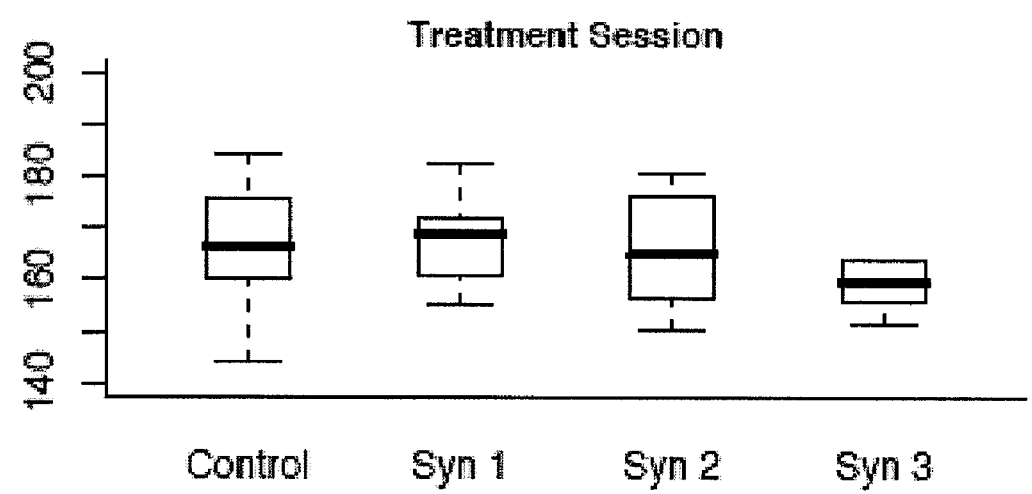

FIGS. 6A-B are boxplots of baseline and treatment normalized intensities in the left caudate, respectively. A major finding of this experiment is that the Syndrome II subjects typically had low average intensities at the baseline session and the physostigmine challenge in the treatment session raised the intensity averages for the subjects in this group. Physostigmine typically had the opposite effect on the other groups. This pattern of change in the four groups was found to occur throughout the brain, in both the deep-brain regions of interest and throughout the cortical regions of the brain. Notably, Haley et al. previously concluded that the Syndrome II group appeared to be the most seriously affected by service in the Gulf War theater of operations.

An important concern in this experiment was whether the syndrome effects were large enough to affect an entire ROI or sufficiently localized so that only portions of deep-brain ROIs are affected. This concern was addressed through the analysis of predicted averages of individual blocks within a structure. Even though structure activation could occur across blocks or wholly within a portion of a block, the analysis of the individual block averages provided important insight into the extent of voxel activity for this SPECT study.

Referring back to FIG. 8, part (b) of the table is the results for individual blocks within each of the ROIs that are listed at the top of the table. Whereas part (a) of the table indicates that there are significant 4-group average treatment-baseline differences only for the left amygdala, left caudate, and left thalamus, part (b) of the table reveals that there are significant 4-group differences for individual blocks in every one of the ROIs listed. The results again primarily involve Syndrome II average treatment-baseline differences being significantly greater than those of other groups.

Figure 7:
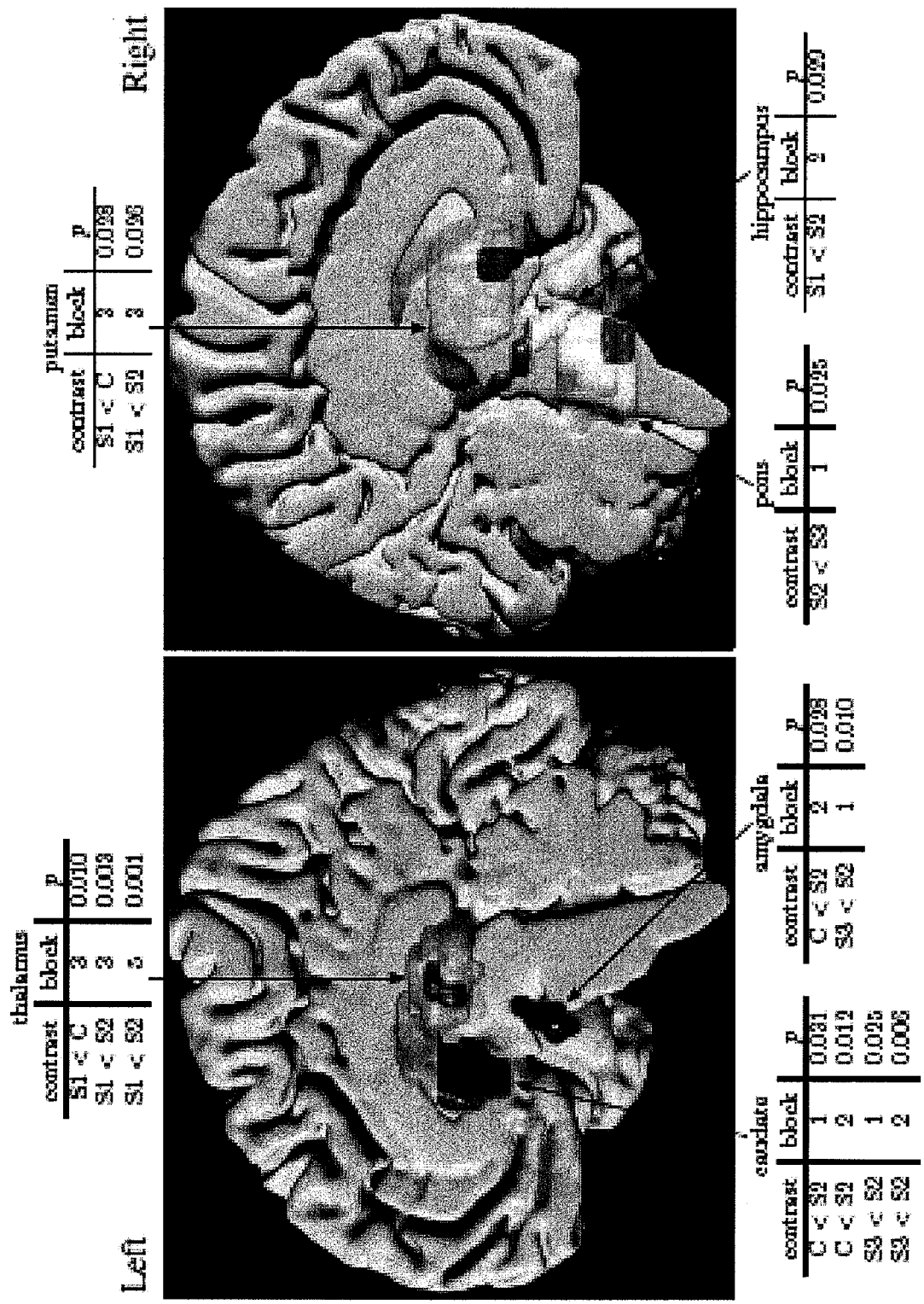
FIG. 7 shows images of a brain illustrating statistically significant differences in block averages for a pairwise comparison of "syndrome II" subjects with other syndrome and control groups, according to an embodiment of the present invention.

The results shown in part (b) of the table are graphically displayed in FIG. 7. In structures where two blocks are significant, the blocks are contiguous. Hence, the structure effect is due to either the entire structure (e.g., the amygdala, where there are only 2 blocks) or a regional portion of the structure where voxels in neighboring blocks are affected.

Further, the relationships between the results reported in parts (a) and (b) of the table should be noted. The statistically significant 4-group ROI comparisons in the left amygdala, left caudate, and left thalamus reported in part (a) result from the significant comparisons shown in part (b) for 2 blocks in each of these small structures. The lack of significant 4-group or pairwise differences for the other structures in part (a) is due to the lack of consistent, significant results in two or more blocks in these structures.

Comparison with SPM Methods

SPM group comparisons were applied, as is customary, to the whole brain. The ability to examine all the voxel results in the brain, as well as those for contiguous clusters of voxels, is one of the important strengths of this approach. However, there are aspects of an experiment that can render SPM methods less sensitive to group differences than alternative approaches. With the highly variable Gulf War SPECT data, the small group sizes, and the suspected impairment of only small areas of the deep brain, routine application of SPM proved less effective than the spatially based approaches described above.

Using whole-brain SPM modeling and analysis, there were no statistically significant clusters of voxels using 2-group SPM t-test comparisons or 4-group F tests. It may be that the combination of kernel smoothing between high-signal ROIs and neighboring low-signal ROIs, count normalization using whole-brain means containing signal changes, and inclusion of the entire brain with highly varying signal intensities lessens the ability to detect treatment-baseline changes in specific small deep-brain ROIs in the Gulf War SPECT data. No improvement resulted when whole-brain analyses were conducted without kernel smoothing and with median white matter count normalization. It is possible that the variability present in whole-brain SPECT measurements with small group sizes is too great for these methods to overcome. Possibly because of these difficulties, it is becoming increasingly accepted in brain imaging literature to publish SPM results with p-values uncorrected for multiple comparisons when the multiple-comparison-corrected p-values are not statistically significant.

SPM analyses were redone using the registration and count normalization methods disclosed herein on specific ROIs in order to make as direct a comparison as possible between voxel-by-voxel analyses and the spatial modeling approach. Kernel smoothing of signal intensities was not performed and image intensities were normalized using median white-matter counts from the centrum semiovale. Cluster-level, small-volume-corrected p-values were calculated using expected Euler-characteristic calculations derived from Gaussian random field theory. Part (c) of the table shown in FIG. 8 indicates that only one cluster of voxels in block 2 of the left caudate produced a significant result, a Control<Syn 2 pairwise comparison. As mentioned above, this significant comparison did not occur with kernel smoothing.

In the analysis of brain imaging data, the spatial modeling and analysis disclosed herein offers important advantages over existing voxel-by-voxel approaches. At least some of the advantages accrue from the similarity of neuronal activity in contiguous sections of brain tissue, as verified by the fitted Gaussian semivariogram models with nuggets very close to 0 and ranges in excess of 6 voxels. This correlation of activation in neighboring voxels occurs, at least in part, because brain tissue tends to activate in regional patterns of various sizes rather than in isolated point activations and because the resolution of SPECT scanners is less than the voxel size.

Existing approaches that make adjustments based on many tests at individual voxel locations or that use corrected cluster-level p-values without explicitly incorporating the spatial correlation characteristics sacrifice the ability to detect small changes in the presence of high variability and small group sizes. The present invention, on the other hand, incorporates intervoxel correlations thus greatly increases sensitivity to differences in group averages for specifically chosen regions of interest.

With respect to the experiment discussed above, it is shown that in the left amygdala, the left caudate, and the left thalamus, the spatial analyses are able to combine the averages from 2 significant block comparisons to provide a statistically significant 4-group comparison for the ROI, shown in Table 1(a). The SPM analysis in part (c) of the table in FIG. 8 relies on clusters of relatively small numbers of voxels in each structure, 79 in the caudate. This cluster size is smaller than those of the significant spatial blocks, approximately 115 voxels in each block in the amygdala, 190 voxels in the caudate, and 100 in the thalamus. Also, in the left caudate, a moderate-size structure consisting of 3 blocks, the SPM analysis identifies only a single significant 2-group comparison, corresponding to our block 2. In contrast, the spatial modeling analysis of the present invention not only finds the same comparison significant using a larger block size, it also finds a second pairwise comparison significant in a different, contiguous block. This in turn may result in the significant pairwise and 4-group comparisons for the entire ROI, shown in part (a) of the table.

Spatial modeling block sizes may be determined by distances at which block averages can be treated as uncorrelated, a feature that is not included in ordinary SPM cluster-level calculations. In spatial modeling of brain images, the estimated range parameter characterizes the distances over which brain activity is highly correlated, and analyses may then be customized to particular imaging datasets through the selection of block sizes. This approach may be based on the geometry of the structures being investigated. Empirically creating blocks is an alternative that may enable medical researchers to assess the extent to which portions of structures are activated or deactivated. Such alternative blocking strategies may help clarify how the activation of one portion of the deep brain is connected to activation or deactivation in other portions by creating blocks that have more homogeneous responses to pharmacologic (e.g., physostigmine) challenges.

Variations to the spatial modeling approach disclosed herein may further improve the analysis of brain imaging data. For example, ROI spatial trend modeling or spatial filtering may offer improved sensitivity to group differences over the quadratic fits used in this article. Moreover, nonconvex distance metrics may be applied to brain structures that do not have simple geometries. In addition, computationally efficient parametric and nonparametric semivariogram model fitting methods may reduce numerical instability when nugget estimates are close to zero and range parameter estimates are large. Also, a time dimension may be added for alternative medical imaging modalities such as functional MRI, or the like.

In one alternative embodiment, a nonparametric semivariogram function (instead of Eq. (1)) may be applied throughout the brain automatically using the following expression:

$$\hat{\gamma}(h) = \sum_{j=1}^{m} \{1 - \Gamma(k/2) \cdot (2/ht_j)^{k/2-1} \cdot J_{k/2-1}(ht_j)\}\hat{p}_j, \quad \text{Eq. (5)}$$

where $\Gamma(\ )$ is a gamma function constant, $J(\ )$ is a Bessel function of the first kind, t's are spatial frequencies, and p's are nonnegative step function constants.

While most of the embodiments and examples discussed below refer to SPECT images, a person of ordinary skill in the art will recognize in light of this disclosure that the systems and methods described herein are also applicable to other types of images created, for example, using positron emission tomography (PET), magnetic resonance imaging (MRI), functional MRI (fMRI), arterial spin labeling (ASL), diffusion tensor imaging (DTI), or the like. Likewise, although the embodiments and examples discussed herein refer specifically to the human brain, images of other organs and/or other animals may be similarly analyzed.

For example, the systems and methods described herein may be adapted to analyze fMRI images as follows. At each voxel location a detrending step may be employed to remove artifactual trend in the time series of images. Parametrically modeling or empirically estimating the hemodynamic response to the experimental stimulus is performed at each voxel, transforming features of the hemodynamic response (e.g., signal peak) across all images of the time series to a single statistic or parameter estimate. This process can be accomplished either by kriging across all images or by Bayesian hierarchical modeling to incorporate the spatial and temporal correlation structure of the statistics or parameter estimates. This results in each subject now having a single 3-dimensional image dataset, with the univariate statistic or parameter estimate at each voxel location. This process has thus eliminated the temporal dimension, leaving a single 3-dimensional parameter map for each subject. Similarly, the systems and methods described herein may also be adapted to process ASL images by averaging the images acquired over time into a single image to increase precision of the signal.

Some of the functions and/or algorithms described above may be implemented, for example, in software or as a combination of software and human implemented procedures. Software may comprise computer executable instructions stored on computer readable media such as memory or other type of storage devices. Further, functions may correspond to modules, which may be software, hardware, firmware or any combination thereof. Multiple functions may be performed in one or more modules as desired, and the embodiments described are merely examples. Software may be executed on a digital signal processor, ASIC, microprocessor, or other type of processor operating on a computer system, such as a personal computer, server or any other computer system.

The software, computer program logic, or code segments implementing various embodiments of the present invention may be stored in a computer readable medium of a computer program product. The term "computer readable medium" includes any medium that can store or transfer information. Examples of the computer program products include an electronic circuit, a semiconductor memory device, a ROM, a flash memory, an erasable ROM (EROM), a floppy diskette, a compact disk CD-ROM, an optical disk, a hard disk, modulated carrier signal, and the like. Code segments may be downloaded via computer networks such as the Internet or the like.

Figure 9:
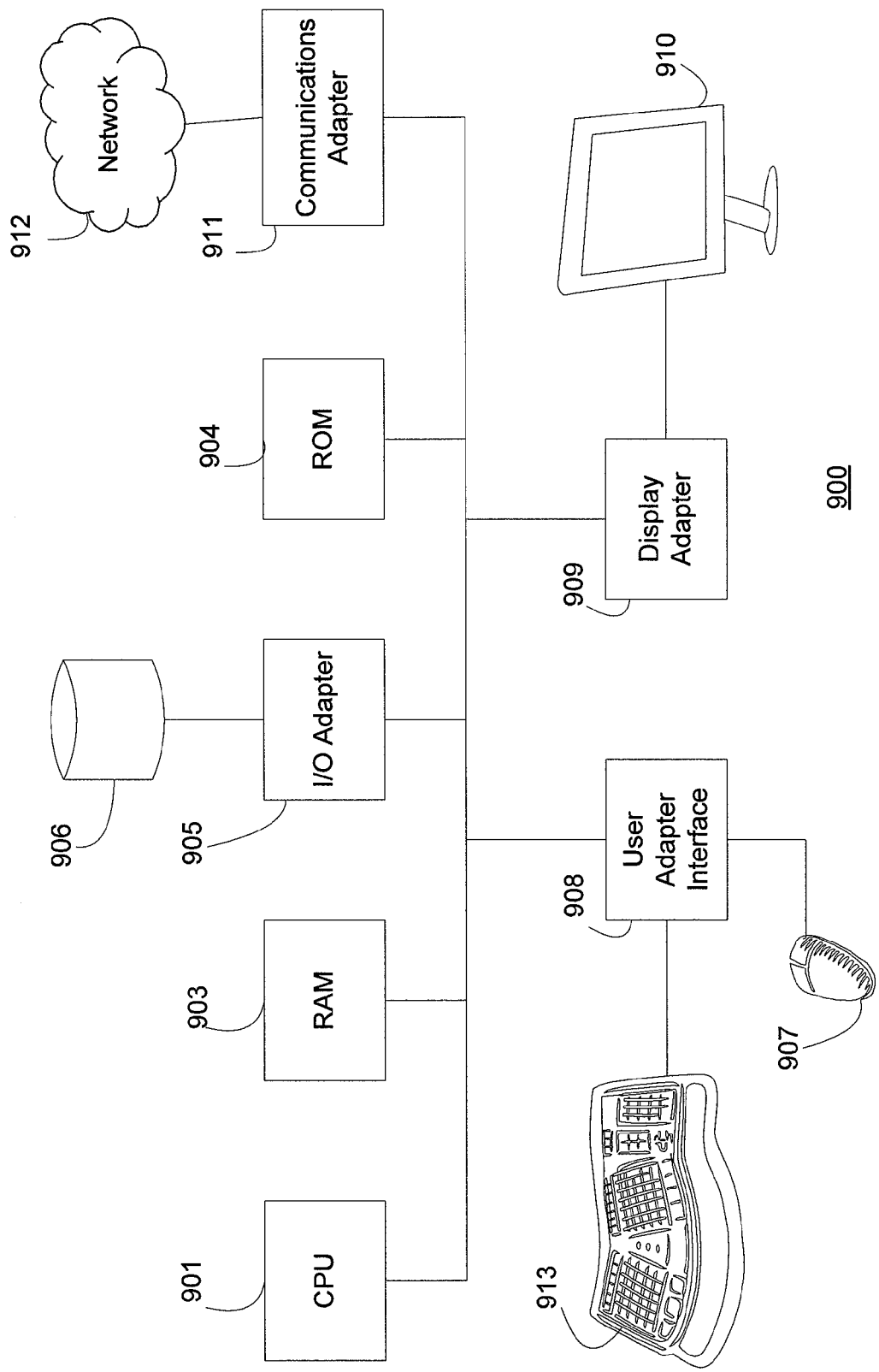
FIG. 9 shows a computer configured to implement certain aspects of the present invention.

FIG. 9 illustrates computer system 900 adapted to implement embodiments of the present invention (e.g., storing and/or executing software associated with the embodiments). Central processing unit ("CPU") 901 is coupled to system bus 902. CPU 901 may be any general purpose CPU. However, embodiments of the present invention are not restricted by the architecture of CPU 901 as long as CPU 901 supports the inventive operations as described herein. Bus 902 is coupled to random access memory ("RAM") 903, which may be SRAM, DRAM, or SDRAM. ROM 904 is also coupled to bus 902, which may be PROM, EPROM, or EEPROM.

Bus 902 is also coupled to input/output ("I/O") controller card 905, communications adapter card 911, user interface card 908, and display card 909. I/O adapter card 905 connects storage devices 906, such as one or more of a hard drive, a CD drive, a floppy disk drive, a tape drive, to computer system 900. I/O adapter 905 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 911 is adapted to couple the computer system 900 to network 912, which may be one or more of a telephone network, a local ("LAN") and/or a wide-area ("WAN") network, an Ethernet network, and/or the Internet. User interface card 908 couples user input devices, such as keyboard 913, pointing device 907, and the like, to computer system 900. Display card 909 is driven by CPU 901 to control the display on display device 910.

Although certain embodiments of the present invention and their advantages have been described herein in detail, it should be understood that various changes, substitutions and alterations can be made without departing from the spirit and scope of the invention as defined by the appended claims. Moreover, the scope of the present invention is not intended to be limited to the particular embodiments of the processes, machines, manufactures, means, methods, and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufactures, means, methods, or steps.

The invention claimed is:

1. A method for processing medical image data, the method comprising:
   receiving a first three-dimensional image comprising a plurality of voxels;
   reducing a regional trend within the three-dimensional image;
   computing, with a processing device, a semivariogram for a region of interest, comprising determining an extent of correlation among at least a subset of the plurality of voxels;
   defining at least one block of spatially correlated voxels;
   calculating, with the processing device, voxel weights for each voxel within the at least one block; and
   determining a block average count and variance for the at least one block.

2. The method of claim 1, further comprising repeating the receiving, reducing, computing, defining, calculating, and determining steps for a second three-dimensional image.

3. The method of claim 2, further comprising performing a statistical analysis upon the first and second three-dimensional images to detect a difference between the first and second three-dimensional images.

4. The method of claim 1, where reducing a regional trend from the three-dimensional image comprises fitting a regional mean spatially across a region.

5. The method of claim 1, where determining the extent of correlation comprises determining a range parameter, the range parameter defining a range between voxels.

6. The method of claim 5, where defining the at least one block comprises defining at least one block of spatially correlated voxels based, at least in part, upon the extent of correlation.

7. The method of claim 5, where defining the at least one block comprises choosing the at least one block so that centers of adjacent blocks are separated by a distance approximately equal to the range parameter.

8. The method of claim 5, where defining the at least one block comprises choosing the at least one block so that centers of adjacent blocks are separated by a distance larger than the range parameter.

9. The method of claim 5, where the at least one block is chosen based upon the range parameter and an anatomic shapes of a region of interest.

10. The method of claim 1, where the at least one block corresponds to a known structure.

11. The method of claim 1, where calculating voxel weights comprises solving a kriging system of equations.

12. The method of claim 1, where determining a block average count and variance comprises taking a weighted average of voxels within a block.

13. The method of claim 1, where the first three-dimensional image is a brain image.

14. A method for processing brain image data with increased sensitivity to facilitate comparisons among groups of subjects, the method comprising:
    selecting a plurality of groups of subjects;
    receiving at least one three-dimensional brain image from each of the subjects, each of three-dimensional brain images comprising a plurality of voxels; and
    modeling, with a processing device, the at least one region of interest of the plurality of three-dimensional brain images, in part, by selecting blocks of voxels so that centers of adjacent blocks are separated by a distance no closer than a range at which voxel counts are uncorrelated.

15. The method of claim 14, further comprising pre-processing the plurality of three-dimensional brain images to reduce a regional trend.

16. The method of claim 14, further comprising averaging a plurality of blocks of for each of the plurality of three-dimensional brain images.

17. The method of claim 16, further comprising using statistical analysis to detect a medical condition for at least one of the plurality of groups of subjects.

18. A computer readable medium having a computer program recorded thereon that causes a computer to perform the steps of:
    receiving a plurality of three-dimensional images, each image comprising a plurality of voxels and each voxel indicating an intensity measurement;
    reducing a regional trend by spatially fitting a regional mean across a region;
    computing semivariograms using detrended voxel measurements for each region of interest (ROI) to determine an extent of intervoxel correlation;
    defining blocks of spatially correlated voxels so that centers of adjacent blocks are no closer than a range parameter computed from the semivariograms;
    calculating voxels weights within each defined block by solving a kriging system of equations; and
    determining block average counts and variances for each block by taking the weighted average of voxels within a block.

19. The computer readable medium of claim 18, the computer program recorded thereon further causing a computer to perform a statistical analysis upon the plurality of three-dimensional images to detect a difference among subsets of the plurality of three-dimensional images, each subset belonging to a different subject group.

* * * * *

UNITED STATES PATENT AND TRADEMARK OFFICE
CERTIFICATE OF CORRECTION

PATENT NO.         : 7,961,922 B2                  Page 1 of 1
APPLICATION NO.    : 11/756454
DATED              : June 14, 2011
INVENTOR(S)        : Jeffrey S. Spence et al.

It is certified that error appears in the above-identified patent and that said Letters Patent is hereby corrected as shown below:

In column 1, lines 9-14, delete paragraph and insert
--This invention was made with government support under Cooperative Agreement Numbers DAMD17-97-2-7025 and DAMD17-01-1-0741 awarded by the U.S. Army Medical Research and Material Command, and Grant Number M01-RR00633 awarded by U.S. Public Health Service. The government has certain rights in the invention.-- therefor.

Signed and Sealed this
Thirteenth Day of September, 2011

David J. Kappos
*Director of the United States Patent and Trademark Office*